Feb. 2, 1971 M. I. GLASS ET AL 3,559,290
TRACING DEVICE
Filed Aug. 27, 1969 2 Sheets-Sheet 1
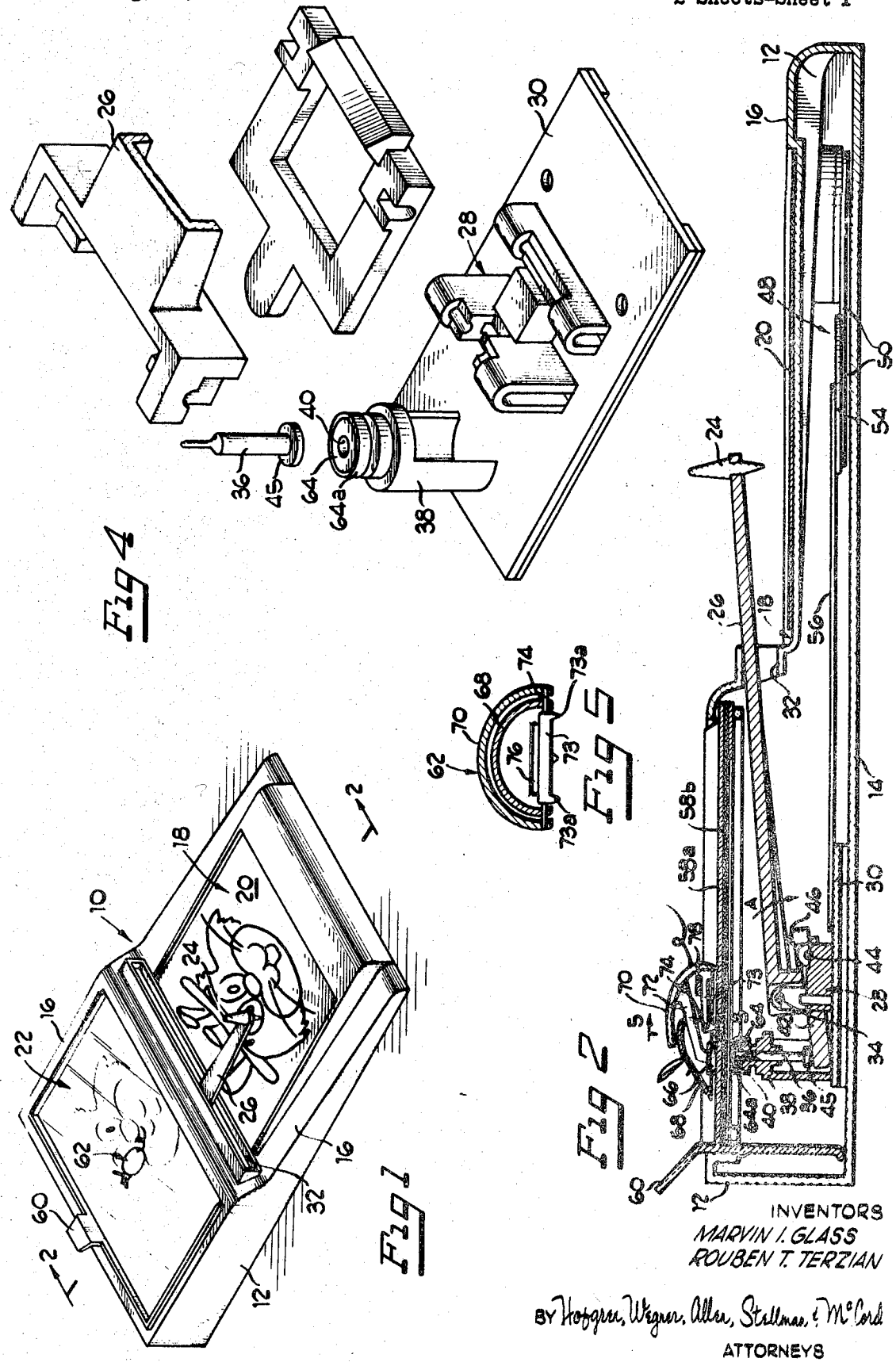
INVENTORS
MARVIN I. GLASS
ROUBEN T. TERZIAN
BY Hofgren, Wegner, Allen, Stellman, & McCord
ATTORNEYS

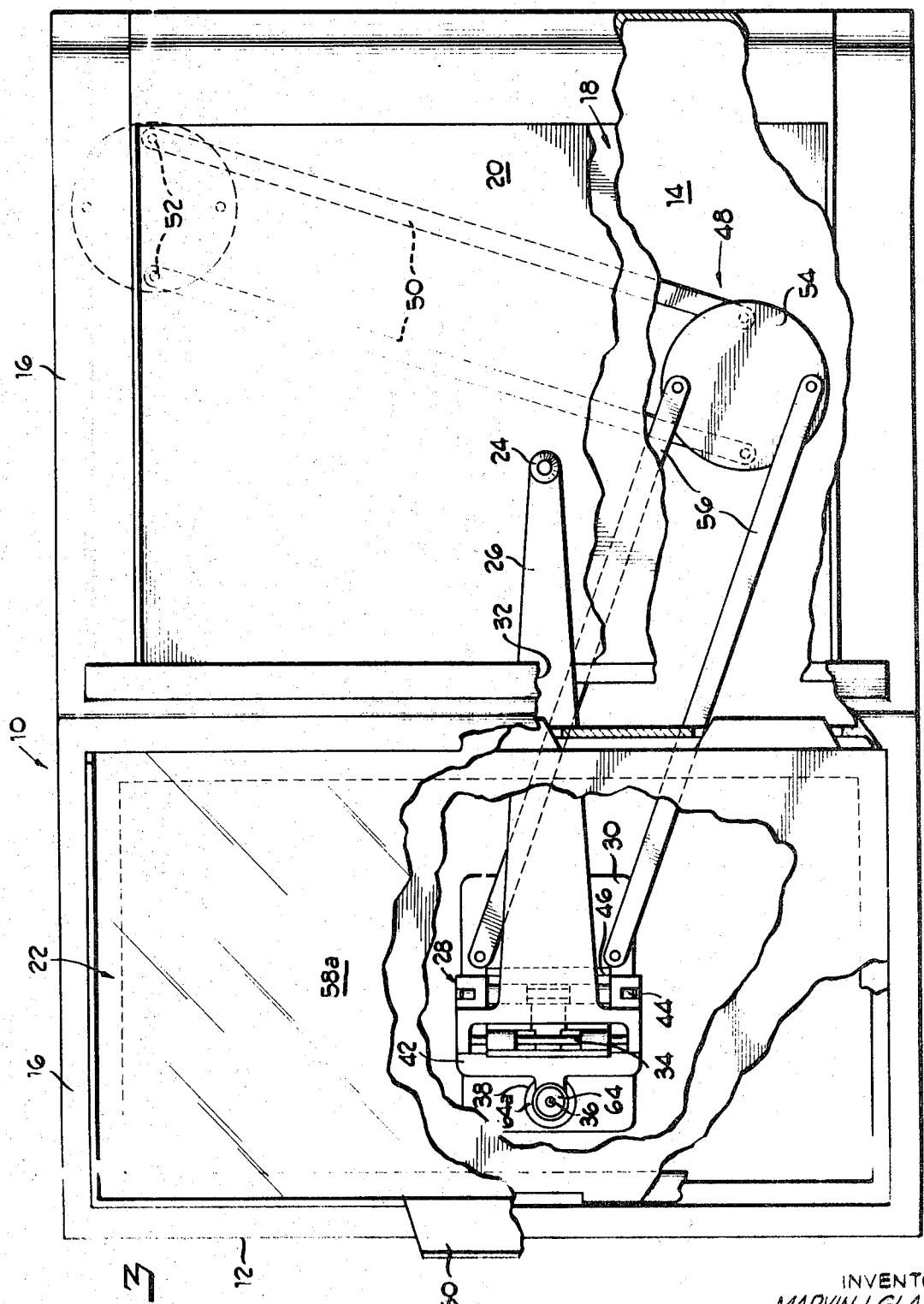

United States Patent Office 3,559,290
Patented Feb. 2, 1971

3,559,290
TRACING DEVICE
Marvin I. Glass and Rouben T. Terzian, Chicago, Ill., assignors to Marvin Glass & Associates, a partnership
Filed Aug. 27, 1969, Ser. No. 853,269
Int. Cl. B41i *13/10*
U.S. Cl. 33—23                                              3 Claims

ABSTRACT OF THE DISCLOSURE

A tracing device which includes a tracing element mounted on a base structure for free movement to trace characters on a workpiece, and an image forming member movable in response to movement of the tracing element to reproduce an image of the traced characters onto a blank. The image forming member is disposed beneath the blank and a simulated live object, such as a small animal form, is positioned on top of the blank and moves with the image forming member by means of a pair of magnetic members mounted on the object and the image forming member. The blank comprises a laminated pressure sensitive structure which permits erasing the reproduced image on separation of the laminated layers thereof.

BACKGROUND AND SUMMARY OF THE INVENTION

One of the first and most important tools used by educators in developing finger and arm coordination in young children for teaching proper writing habits is the practice of having the child trace known objects or written matter. The present invention relates to a tracing device which adds incentive and enjoyment for a child to enhance his desire to trace and thereby develop proper finger and arm coordination for writing purposes.

A principal object, therefore, of the present invention is to provide a new and improved tracing device.

Another object of the invention is to provide a tracing device which is designed to add incentive and enjoyment for a child in tracing, by employing means simulating a live object such as a small animal which moves over and about a blank to reproduce an image which is traced by manipulation of a tracing element which is mounted on a base structure for free movement to trace characters on a workpiece. The device is constructed to give the effect that the simulated live object moves independently of but in response to manipulation of the tracing element.

A further object of the invention is to provide a tracing device as set forth in the preceding paragraph wherein an image forming means is mounted beneath the blank on which the traced character is to be reproduced, and the image forming means moves below the blank in response to and corresponding to the movement of the tracing element. The simulated live object is positioned on top of the blank, and the object and image forming means are provided with complementary magnetic members so that the object moves over and about the blank in the same path followed by the image forming means movably mounted beneath the blank.

Still another object of the invention is to provide a tracing device of the character described, and including a base structure which has means for positioning a workpiece to be traced in a position facing the user. A tracing element is mounted on the base structure for free movement in the area of the workpiece positioning means to permit easy manipulation to trace characters on the workpiece. A display position is defined on the base structure and includes a display screen facing the user. The positioning area is disposed on the base structure closer to the user to provide easy manipulation of the tracing element and the display screen is disposed further away from the user to provide easy visual observation of the screen while tracing. An image forming means is connected by a parallelogram linkage to the tracing element to reproduce on the display screen the characters on the workpiece as the tracing element is manipulated to trace the characters.

Yet a further object of the invention is to provide a tracing device as set forth in the preceding paragraph wherein the display screen comprises a pressure sensitive means which includes a pair of layers between which the image is produced by adherence of the layers to each other, with the outer layer being at least translucent to permit visual observation of the image. The image forming means exerts pressure against the inner or lower layer to cause adherence between the layers and thereby reproduce the image of the traced characters. Readily accessible means are provided for selectively separating the layers to erase the reproduced image.

Other objects, features and advantages of the invention will become apparent from the following detailed description taken in connection with the accompanying drawings.

DESCRIPTION OF THE DRAWINGS

FIG. 1 is a perspective view of a tracing device embodying the concepts of the present invention;

FIG. 2 is a section, on an enlarged scale, taken generally in the direction of line 2—2 of FIG. 1;

FIG. 3 is a top plan view of the device shown in FIG. 2, with portions thereof broken away to facilitate an illustration of certain interior components of the device;

FIG. 4 is an exploded perspective view, on an enlarged scale, of the components of the image reproducing means portion of the invention; and FIG. 5 is a section taken generally along the line 5—5 of FIG. 2 through the simulated mouse follower.

DETAILED DESCRIPTION OF THE INVENTION

Referring to the drawings in greater detail, the invention is shown therein as incorporated in a tracing device, generally designated 10, which comprises a generally rectangular, substantially hollow base structure 12 which has a flat bottom wall 14 (FIG. 2) for lying on a generally flat surface such as a desk top. The top wall 16 of the hollow base structure 12 has a stepped configuration so as to define a lower, forward area, generally designated 18, which is recessed for positioning a workpiece 20 to be traced by a user, such as a child, and in a position to face upwardly toward the child as he sits at a desk or the like. The stepped top wall 16 of the base structure 12 also defines an upper, rear display position, generally designated 22, which comprises a blank in the form of a display screen to be described in greater detail hereinafter.

A pointed tracing element 24 is connected to the outer end of a rigid lever arm 26 which is pivoted to a mounting block, generally designated 28, which is fixed to the top of a floating base plate 30 disposed within the hollow base structure 12. The lever arm 26 extends through a generally horizontal elongated opening 32 in the top wall 16 of the base structure 12, between the workpiece positioning area 18 and the display area 22, whereby the tracing element 24 on the outer end of the lever arm 26 is easily grasped by a user to trace the workpiece 20 positioned in the recessed area 18. The inner end of the lever arm 26 is pivoted at a pivot pin 34 to the mounting block 28. The base plate 30 on which is fixed the mounting block 28 is relatively large so as to maintain stability when lever arm 26 is manipulated and the base plate slides along the upper surface of the bottom wall 14 within the base structure 12.

An image forming means comprising a vertically reciprocating stylus or pin member 36 is mounted within a bearing support structure 38 fixed to the top of the base plate 30. The pin member 36 is freely vertically movable within a bore 40 in the bearing structure 38 whereby the pin member may be moved upwardly (by lever arm 26, as described below) into pressure engagement with the underside of the display screen 22. A rocking lever member 42 is pivotally mounted by a pivot pin 44 to the mounting block 28 so as to underlie the rear end of the lever arm 26, with the pivot pin 44 disposed forwardly of the pin 34 which pivotally mounts the lever arm 26 to the mounting block 28. The lower end of the vertically reciprocating image forming member 36 has a weighted portion 45 to urge the pin downwardly with the weight 45 resting by gravity on top of the rear portion of the rocking lever member 42 when the lever member is raised as seen in FIG. 2. Preferably the pin member 36 comprises a ball pointed member so as not to tear the layer 58b and to ride smoothly when pressed against the layer.

Referring particularly to FIG. 2, it can be seen that a raised ridge portion 46 of the rocking lever member 42 bears against the underside of the lever arm 26 on which is mounted the tracing element 24. Because of the short moment arm between the pivot pin 44 and the raised ridge portion 46 of the rocking lever member 42, and because of the large mass of the rocking lever member 42 disposed behind the pivot pin 44, the lever arm 26 normally is held in a raised position (FIG. 2) with the tracing element 24 raised above the workpiece 20 disposed in the recessed area 18. In this position, the image reproducing pin member 36 is in its lower inoperative position as shown in FIG. 2. When it is desired to trace characters on the workpiece 20, the tracing element 24 is depressed to pivot the lever arm 26 about pivot pin 34. As this happens, the rear end of the lever arm 26, in front of the pivot pin 34, is urged downwardly against the raised ridge portion 46 of the rocking lever member 42 causing the lever member 42 to rock about pivot pin 44 in the direction of arrow A (FIG. 2) to bias the image forming pin member 36 upwardly into pressure engagement with the underside of the display screen 22.

Referring to FIG. 3, a parallelogram type linkage means, generally designated 48, is provided between the fixed based structure 12 and the floating base plate 30 to transmit lateral or horizontal movement from the tracing element 24 to the base plate 30, and thus to the image reproducing pin member 36. The parallelogram structure includes a pair of elongate parallel link arms 50 pivotally connected at adjacent ends thereof to the base structure 12 at pivot pins 52 and pivotally connected at their opposite ends to a disc shaped link member 54. The pivot pins 52 are disposed on a line generally parallel to the adjacent sides of the screen 22, base structure 12 and base plate 30. A second pair of elongate link arms 56 are pivotally connected to both the disc shaped link member 54 and the floating base plate 30. The link arms 50 and 56 are pivoted on the disc link 54 at points 90° thereabout. With this linkage, front to rear movement or sideways movement of the tracing element 24 causes identical movement of the image reproducing pin member 36, rather than permitting twisting or pivoting movement about either the tracing element or the pin member.

The display screen 22 comprises a pressure sensitive means which includes a pair of layers 58a, 58b between which an image is produced by adherence of the layers to each other in response to pressure therebetween. The upper or outer layer 58a is fabricated of a relatively rigid material which is translucent or transparent to permit visual observation of the image produced between the layers. Preferably the upper surface of the layer 58a is very smooth to reduce friction. The lower surface thereof may be etched or sandblasted to provide a translucent layer. The lower or inner layer 58b is fabricated of a more flexible or yielding substance which adheres to the underside of the upper layer 58a in response to pressure exerted thereon as by the image reproducing pin member 36, to produce an image by such adherence. The layer 58b may be fabricated of various colored materials.

In operation, the tracing element 24 is depressed into engagement with the workpiece 20 for tracing thereof. As described above, when this happens, the image reproducing pin member 36 is urged upwardly, with the upper portion thereof moved into pressure contact with the lower layer 58b of the pressure sensitive image reproducing screen 22. As the tracing element 24 is moved about the workpiece to trace the characters thereon, the pin member 36 moves about the underside of the layer 58b of the display screen 22 to cause adherence between the layers 58a, 58b at points or areas of contact by the pin member and a corresponding image is reproduced. When the tracing element 24 is released, the lever arm 26 will pivot back to its raised position about pivot pin 34 and the image reproducing pin member 36 will move downwardly out of pressure contact with the lower screen layer 58b. The rigid upper layer 58a of the display screen 22 has a tongue or tab portion 60 extending upwardly for easy grasping to lift the upper screen layer 58a to thereby separate the layers and erase the image produced therebetween.

A feature of the invention is the utilization of means defining a simulated live object or follower, generally designated 62, such as a simulated animal (a mouse is simulated in the drawings). This feature is important in that it adds incentive and enjoyment for the child as it gives the effect that the mouse is moving independently over the top of the display screen 22 in response to movement of the tracing element 24. This is accomplished by employing a magnet member 64 mounted on top of the bearing support structure 38 surrounding the bore 40 in which the image reproducing pin member 36 reciprocates, and a second, attracting, magnet member 66 mounted on the underside of the stimulated mouse. Since the magnets are attracted to each other, the mouse will follow the magnet 64 and image reproducing pin member 36 as the tracing element 24 is moved to trace characters on the workpiece 20, and thereby gives the effect that the mouse actually is doing the tracing in response to manipulation of the tracing element 24 by the child. The magnet 64 includes an outer ring portion 64a of metallic material to enhance the magnetism of the device.

As shown in the drawings, the mouse is a two part structure having a head portion 68 and a body portion 70. The magnet 66 is mounted by means of an arm 72 to the underside of the body portion 70 for movement of the mouse bodily along the upper surface of the display screen 22 as it follows magnet 64. The head portion 68 is secured to a fulcrum member 73 which has depending fulcrum portions 73a riding on the upper surface of layer 58a. The fulcrum member 73 is pivotally mounted on the body portion 70 of the mouse by means of a pivot rod 74 secured to and disposed within the body portion 70 and a counterweight 76 is provided on the member 73 to counterbalance the weight of the head portion 68 and provide a rocking or "wobbly movement of the head portion with respect to the body portion 70 as the simulated mouse moves over the top surface of the display screen 22 in response to movement of the tracing element 24.

The foregoing detailed description has been given for clearness of understanding only and no unnecessary limitations should be understood therefrom as some modifications will be obvious to those skilled in the art.

We claim:

1. A tracing device comprising a base structure, means on the base structure for positioning a work piece to be traced, a tracing element mounted on the base structure for free movement in the area of said work piece positioning means to permit easy manipulation to trace characters on a positioned work piece, means on said base structure defining a display position including a display screen facing the user, said display screen comprising an outer layer of translucent rigid material and an inner layer of flexible material adapted to adhere to the outer layer and thereby produce an image visible through the outer layer, stylus means movably mounted on said base structure at a position beneath said display screen and operable to exert pressure against said inner layer to cause the latter to adhere to the outer layer and thereby create an image, link means connecting said tracing element with said stylus for movement of the latter throughout the area of said display screen and also for movement of the stylus into engagement with said inner layer so as to reproduce on said display screen the lines on said work piece as the latter is traced by manipulation of said tracing element, a follower element removably supported on the upper surface of said display screen, cooperating means on said follower element and said stylus means which includes at least one magnet and is effective to cause said follower element to move across said display screen as said stylus means is being manipulated by said tracing means, so as to provide the illusion that the follower element is forming the image on the display screen.

2. A tracing device as set forth in claim 1, wherein said link means connecting said tracing element with said stylus means comprises a first pair of parallel links pivotally connected at adjacent ends to said base structure, a disk shaped member pivotally connected to the opposite ends of said first pair of parallel links, a second pair of parallel links pivotally connected to said disk shaped member at adjacent ends thereof, a base plate supported at the opposite ends of said second pair of parallel links, and means supporting said tracing element including an arm having an intermediate portion pivotally supported on said base plate, said arm carrying said tracing element on one end and having its opposite end engaging said stylus means so that downward movement of said tracing element produces upward movement of said stylus means.

3. A tracing device as set forth in claim 1 wherein said cooperating means includes a first magnet on said follower element and a second magnet on the stylus means in the form of an annular element receiving the portion of the stylus means adapted to engage said inner layer.

References Cited
UNITED STATES PATENTS

| | | | |
|---|---|---|---|
| 817,092 | 4/1906 | Reeves | 33—23(C) |
| 2,651,140 | 9/1953 | Kovac | 46—240 |
| 2,817,926 | 12/1957 | De Cicco | 46—103X |
| 3,061,948 | 11/1962 | Stubbmann | 33—25(A) |
| 3,114,547 | 12/1963 | Joslyn | 273—1(M) |
| 3,333,341 | 8/1967 | Wuerthner | 33—25(A) |
| 3,426,476 | 2/1969 | Ayala | 46—119 |

HARRY N. HAROIAN, Primary Examiner